(12) United States Patent
Jin (10) Patent No.: US 10,630,963 B2
(45) Date of Patent: Apr. 21, 2020

(54) AUTOSTEREOSCOPIC 3-DIMENSIONAL DISPLAY

(71) Applicant: LG DISPLAY CO., LTD., Seoul (KR)

(72) Inventor: Youyong Jin, Seoul (KR)

(73) Assignee: LG DISPLAY CO., LTD., Seoul (KR)

(*) Notice: Subject to any disclaimer, the term of this patent is extended or adjusted under 35 U.S.C. 154(b) by 89 days.

(21) Appl. No.: 15/825,938

(22) Filed: Nov. 29, 2017

(65) Prior Publication Data

US 2018/0152695 A1  May 31, 2018

(30) Foreign Application Priority Data

Nov. 30, 2016 (KR) .......................... 10-2016-0162363

(51) Int. Cl.
*H04N 13/305* (2018.01)
*H04N 13/324* (2018.01)
*H04N 13/317* (2018.01)

(52) U.S. Cl.
CPC ......... *H04N 13/305* (2018.05); *H04N 13/317* (2018.05); *H04N 13/324* (2018.05); *H04N 2213/001* (2013.01)

(58) Field of Classification Search
USPC .......................................................... 348/51
See application file for complete search history.

(56) References Cited

U.S. PATENT DOCUMENTS

| | | | | |
|---|---|---|---|---|
| 8,917,441 | B2 * | 12/2014 | Woodgate | G02B 27/2214 359/298 |
| 2008/0316379 | A1 * | 12/2008 | Zuidema | H04N 13/305 349/15 |
| 2015/0341623 | A1 * | 11/2015 | Kim | G02B 27/2214 348/59 |
| 2017/0127050 | A1 * | 5/2017 | Mather | G02B 3/0037 |

FOREIGN PATENT DOCUMENTS

JP       2014160282 A  *  9/2014  ............. G03B 35/24
WO   WO-2015198606 A1 *  12/2015

OTHER PUBLICATIONS

Yuki Akimasa. Machine translation of JP 2014-160282 A (Year: 2014).*

* cited by examiner

*Primary Examiner* — Christopher S Kelley
*Assistant Examiner* — Ana Picon-Feliciano
(74) *Attorney, Agent, or Firm* — Birch, Stewart, Kolasch & Birch, LLP (57) ABSTRACT

The present disclosure relates to an autostereoscopic three-dimensional (3D) display in which the multi view structure is configured by using a lenticular lens. The autostereoscopic 3D display includes a display panel including a plurality of pixels, and an aperture area disposed at each pixel; and a lens film disposed on a front surface of the display panel and including a plurality of lenticular lenses, the lenticular lenses having a slanted axis and continuously arrayed along to a lateral direction, wherein the aperture area includes at least (Continued)

two sub-aperture areas having a same size and same shape of a parallelogram, and the slanted axis is parallel with any one diagonal axis of the sub-aperture area.

14 Claims, 9 Drawing Sheets

AUTOSTEREOSCOPIC 3-DIMENSIONAL DISPLAY

CROSS-REFERENCE TO RELATED APPLICATIONS

This application claims the priority benefit of Korean Patent Application No. 10-2016-0162363 filed on Nov. 30, 2016 in the Republic of Korea, which is incorporated herein by reference for all purposes as if fully set forth herein.

BACKGROUND

Technical Field

The present disclosure relates to an autostereoscopic three-dimensional (3D) display in which the multi view structure is configured by using a lenticular lens (also referred to hereinafter as a 'lenticular lens type'). In particular, the present disclosure relates to a lenticular lens type autostereoscopic 3D display representing high quality 3D images in which the brightness differences between the view areas are uniformed regardless of the tolerances of the manufacturing process.

Description of the Related Art

Due to the development of the stereoscopic image display technologies, a stereoscopic image reproducing technique is applied to a display device such as a television or monitor, so that anyone can appreciate a stereoscopic image anywhere. A stereoscopic image display may be defined as a system for artificially reproducing a 3D image.

The reason why a person feels visually stereoscopic is because of binocular disparity, which is caused by the fact that the eyes are separated apart 65 mm in the horizontal direction. When a person's eyes observe a thing, because of binocular parallax, each of the two eyes see different images, respectively, viewed from a slightly different angle. As these two images are sent to the brain through the retina, the brain can recognize the stereoscopic image by precisely combining these two images.

The autostereoscopic 3D display generates a virtual stereoscopic effect through a design that displays both the left eye image and the right eye image in the two-dimensional display according to the mechanism of the binocular disparity, and sends them to the left eye and the right eye, respectively. As the methods for realizing binocular parallax, a spectacle type (or glasses type) display and a non-spectacle type (or non-glasses type) display have been developed.

In the non-spectacle type display (or 'autostereoscopic 3D display'), the left eye image and the right eye image are displayed at the same time, and the optical axes of these two images are separated from each other. These images are provided to the left eye and the right eye, respectively. The non-spectacle type display may be divided into the parallax barrier system, the lenticular lens system and the integral photography system. In the parallax barrier system, a vertical grid-like aperture is disposed on the front of the display to separate the left eye image and the right eye image. In the lenticular lens system, a lens film in which a plurality of the semi-cylindrical lenses is continuously arrayed is attached to a front surface of the display to provide the left eye image and the right eye image. The integral photography system uses a dragonfly-eye-shaped lens plate to separate the left eye image and the right eye image.

Figure 1:
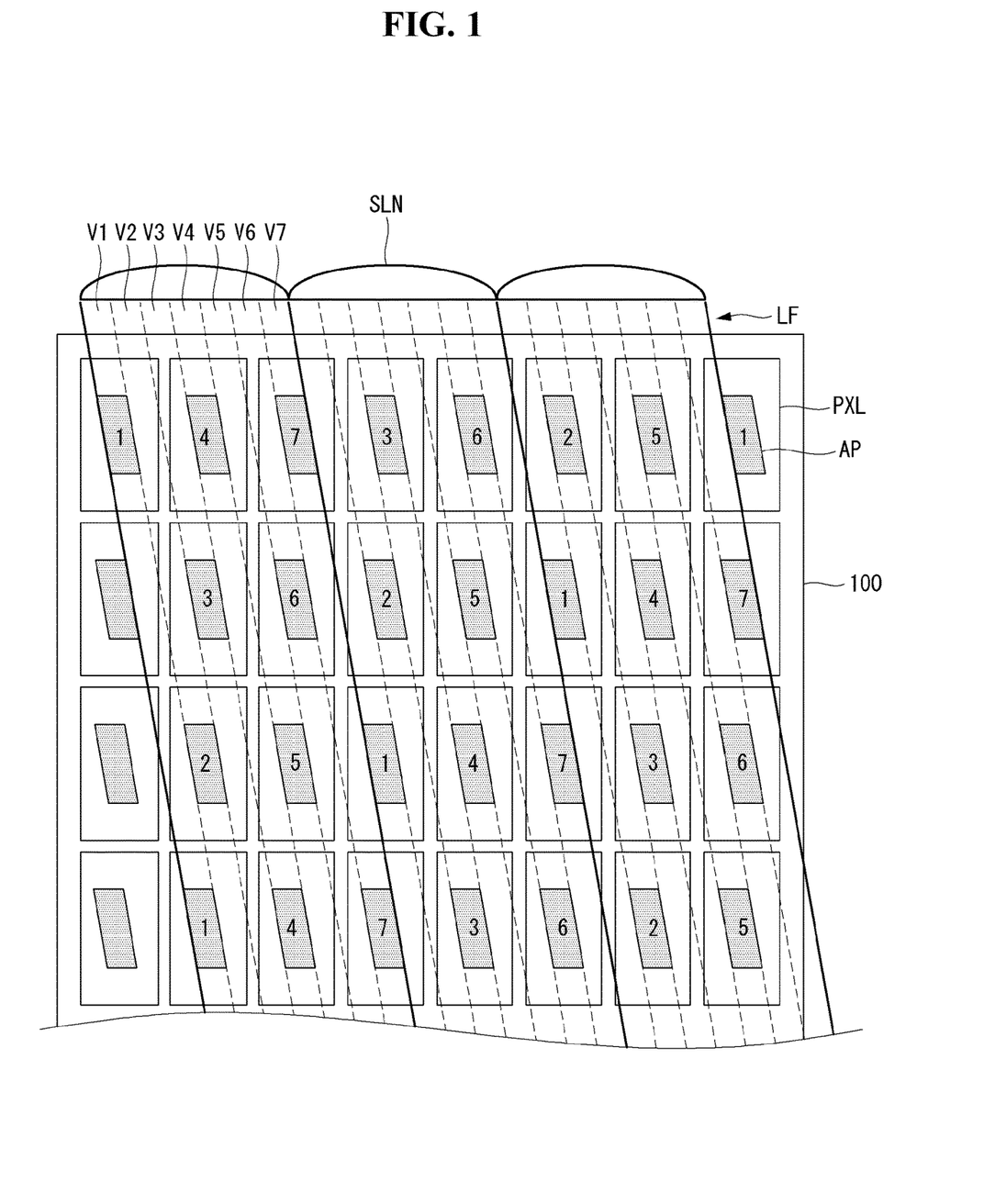
FIG. 1 is a plane view illustrating the structure of a lenticular lens type autostereoscopic 3D display according to the related art.

Referring to FIG. 1, a lenticular lens type autostereoscopic 3D display according to the related art will be explained. FIG. 1 is a plane view illustrating the structure of a lenticular lens type autostereoscopic 3D display according to the related art. FIG. 1 shows the case in which the autostereoscopic 3D display includes 7 view areas separated from each other by the lenticular lens that is attached on the display panel with a ⅓ delta design.

Referring to FIG. 1, the lenticular type autostereoscopic 3D display according to the related art comprises a display panel DP and a lens film LF disposed on the front surface of the display panel DP. The display panel DP includes a plurality of pixels P×L arrayed in a matrix manner. At each pixel PXL, an aperture area AP is defined. The aperture area AP is the area for representing the color and brightness allocated at the pixel PXL. For example, the aperture area AP may be defined as the area representing any one color of the red color R, the green color G and the blue color B. Other areas of the display panel 100 excepting the aperture area AP are covered by the black matrix.

The display panel DP may be a flat display panel such as the liquid crystal display panel or the organic light emitting diode display panel. The display panel DP may further include various elements such as a gate line, a data line, a thin film transistor and so on, as well as the pixel PXL. Here, for convenience, these elements of the display panel DP would not be explained.

The lens film LF includes a plurality of lenticular lenses SLNs having a predetermined width. For example, a plurality of semi-cylindrical lenticular lenses is continuously arrayed. Further, the lenticular lens SLN is slanted at a predetermined angle with an inclination. Here, the slanted (or inclined) angle of the lenticular lens SLN is decided by the 'delta' value.

For the case of ⅓ delta structure as shown in FIG. 1, the pixels for the same view area are assigned at every one pixel in the horizontal direction and at every three pixels in the vertical direction. Under this condition, as the width of one lenticular lens SLN is covering to the width of three pixels PXL, one lenticular lens SLN has seven view areas V1 to V7 separated from each other. The pixels allocated at any one view area V1 to V7 represent one kind of view image. The number written at each aperture area AP means the kind of the view area V1 to V7 allocated at the aperture area AP.

As shown in FIG. 1, the aperture areas AP allocated to the first view area V1 represent the first view image. The aperture areas AP allocated to the second view area V2 represent the second view image. In this manner, the k-th view image Vk is displayed on the aperture area AP allocated to the k-th view area Vk. Here, 'k' is an integer number from 1 to 7.

Figure 2A:
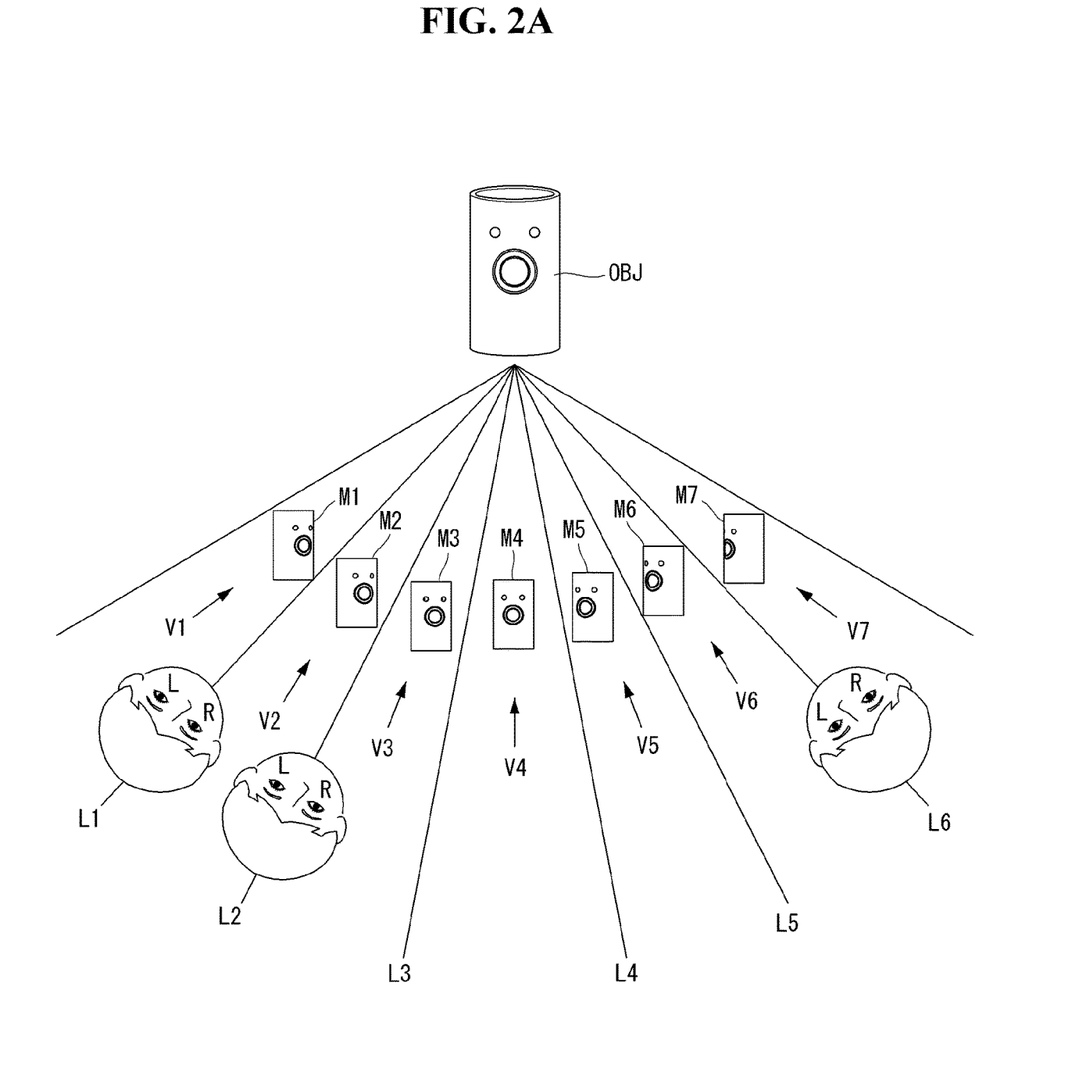
FIGS. 2A and 2B are schematic diagrams illustrating a mechanism for displaying an object as a stereoscopic image according to the related art.
Figure 2B:
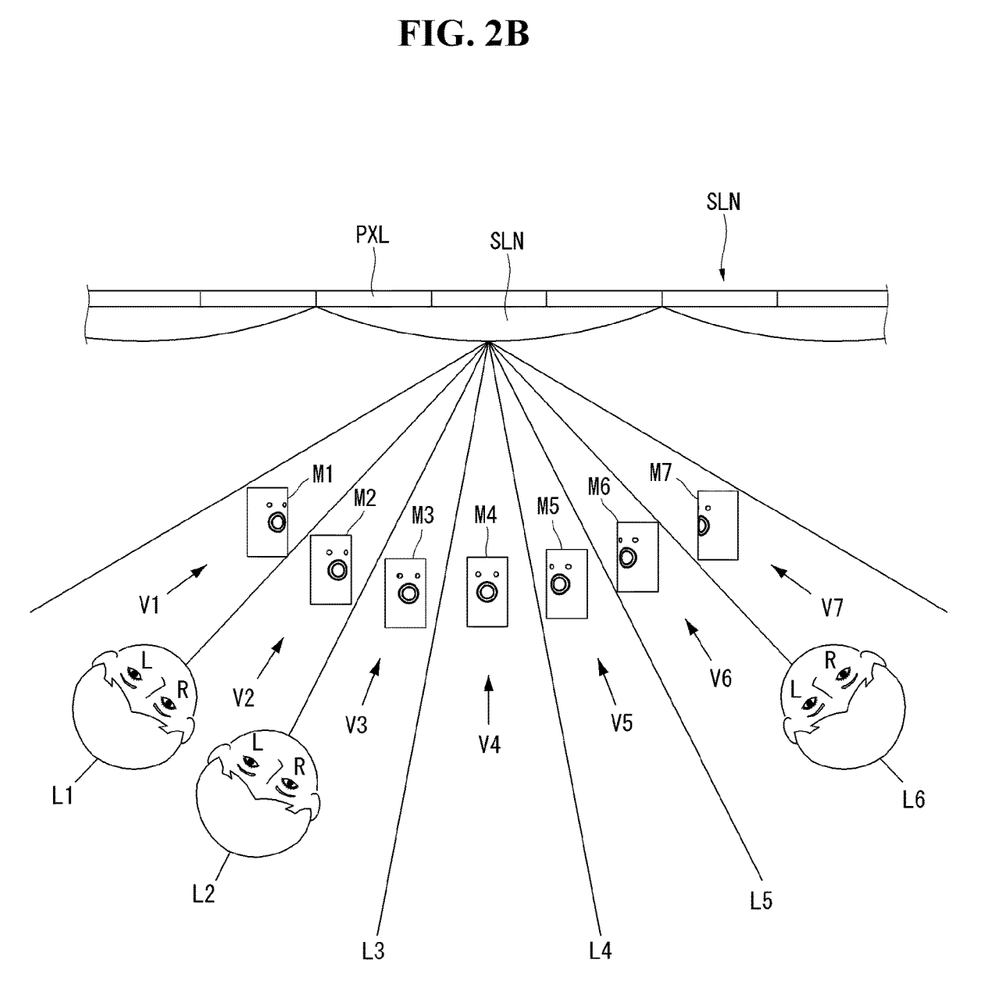

FIGS. 2A and 2B are schematic diagrams illustrating a mechanism for displaying an object OBJ as a stereoscopic image.

Referring to FIG. 2A, different images are seen according to the direction in which the object OBJ is observed. The stereoscopic image of the object is divided into the seven view areas (multi-view area) including V1 to V7. The k-th image Sk is shown at the k-th view area Vk. Here, k is the integer number from 1 to 7. The first image M1 is observed (or displayed) at the first view area V1, the second image M2 is observed at the second view area V2, the third image M3 is observed at the third view area V3, and the seventh image M7 is observed at the seventh view area V7.

When the left eye of the observer is located at the first view area V1 and the right eye of the observer is located at the second view area V2, the left eye recognizes the first image M1 and the right eye recognizes the second image M2. Then by combining this binocular disparity, the observer's brain perceives the object OBJ stereoscopically.

Referring to FIG. 2B, the lenticular lens type autostereoscopic 3D display realizes the stereoscopic effect or mechanism using a flat panel display. In the flat panel display shown in FIG. 1, the seven view areas are separated by the lenticular lens SLN, and the pixels PXL allocated at each view area display the image associated to each view area.

As shown in FIG. 2B, each of the seven images M1 to M7 is provided to each of the seven view areas V1 to V7 separated by the lenticular lens SLN, respectively. When a person observes the display at the position L1, the left eye is located at the first view area V1 and the right eye is located at the second view area V2. Then, the observer can enjoy the same stereoscopic feeling as that of looking the object OBJ at the position L1 in FIG. 2A. When the person moves to the position L4, the left eye L is located at the fourth view area V4 and the right eye R is located at the fifth view area V5. Then, observer can enjoy the same stereoscopic feeling as that of looking the object OBJ at the position L4 in FIG. 2A.

In the process of manufacturing the display panel having this structure, the luminance unevenness may occur due to the manufacturing process tolerance. The luminance unevenness is recognized as a bright line or a dark line when a person views a stereoscopic image while moving. The luminance unevenness hinders the observation of the normal stereoscopic image. Therefore, in the lenticular lens type autostereoscopic 3D display, it is necessary to supplement the design so that the uniform luminance is maintained, even if the observing position is changed.

SUMMARY

In order to address the above mentioned drawbacks, the purpose of the present disclosure is to provide a lenticular lens type autostereoscopic 3D display in which the luminance uniformity is ensured as the viewing position is moved.

In order to accomplish the above purpose, the present disclosure provides an autostereoscopic 3D display comprising a display panel including a plurality of pixels, and an aperture area disposed at each pixel; and a lens film disposed on a front surface of the display panel and including a plurality of lenticular lenses, the lenticular lenses having a slanted axis and continuously arrayed along to a lateral direction, the aperture area includes at least two sub-aperture areas having a same size and same shape of a parallelogram, and the slanted axis is parallel with any one diagonal axis of the sub-aperture area.

In one embodiment, the autostereoscopic 3D display further comprises a left expansion area expanded from a left side of the aperture area to a left direction with a first width, and a right expanding area expanded from a right side of the aperture area to a right direction with a second width.

In one embodiment, the first width is equal to the second width.

In one embodiment, the slanted axis is parallel to a first diagonal axis straightly connecting from a right-upper corner point to a left-lower corner point of the sub-aperture area.

In one embodiment, the slanted axis is parallel to a second diagonal axis straightly connecting from a left-upper corner point to a right-lower corner point of the sub-aperture area.

In one embodiment, the first width is selected in range of approximately 0.5 μm to 1.5 μm, inclusively, when a manufacturing process tolerance is 2 μm.

In one embodiment, the left expansion area and the right expanding area have segment shapes parallel to each other.

In one embodiment, any one lenticular lens includes n view areas, where n is a natural number, each of the n view areas has a strip shape parallel with the slanted axis and has a view width, the view widths of the n view areas have a same value, and any one aperture area disposed as corresponding to any one of the n view areas.

In one embodiment, the aperture areas disposed at a $k^{th}$ view area are disposed at the pixel areas representing a $k^{th}$ video image, where k is one of 1 to n.

In one embodiment, an aperture width defined as the lateral width of the aperture area corresponds to the view width.

The present disclosure provides a lenticular lens type autostereoscopic 3D display in which the aperture area disposed within the view area of the lenticular lens is divided into two sub-aperture areas at least, and the expansion areas are intentionally added to the left side and the right side of the aperture area, respectively. Particularly, each of the expansion areas has the width corresponding to half of the manufacturing process tolerance. As the results, the white (or brighter) lines exist between the sub-aperture areas. As the white line has the same width as the manufacturing process tolerance, the luminance difference is uniformly distributed over the whole display area. As the results, as observing the stereoscopic image with moving over the whole display area, there is no luminance variation. The lenticular lens type autostereoscopic 3D display according to the present disclosure provides a natural and/or smooth stereoscopic image without remarkable variations on the luminance as the observer moves across the display area.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION OF THE EMBODIMENTS

Referring to attached figures, preferred embodiments of the present disclosure will be explained. Like reference numerals designate like elements throughout the detailed description. However, the present disclosure is not restricted by these embodiments but can be applied to various changes or modifications without changing the technical spirit. In the following embodiments, the names of the elements are selected by considering the easiness for explanation so that they may be different from actual names.

First Embodiment

Figure 3:
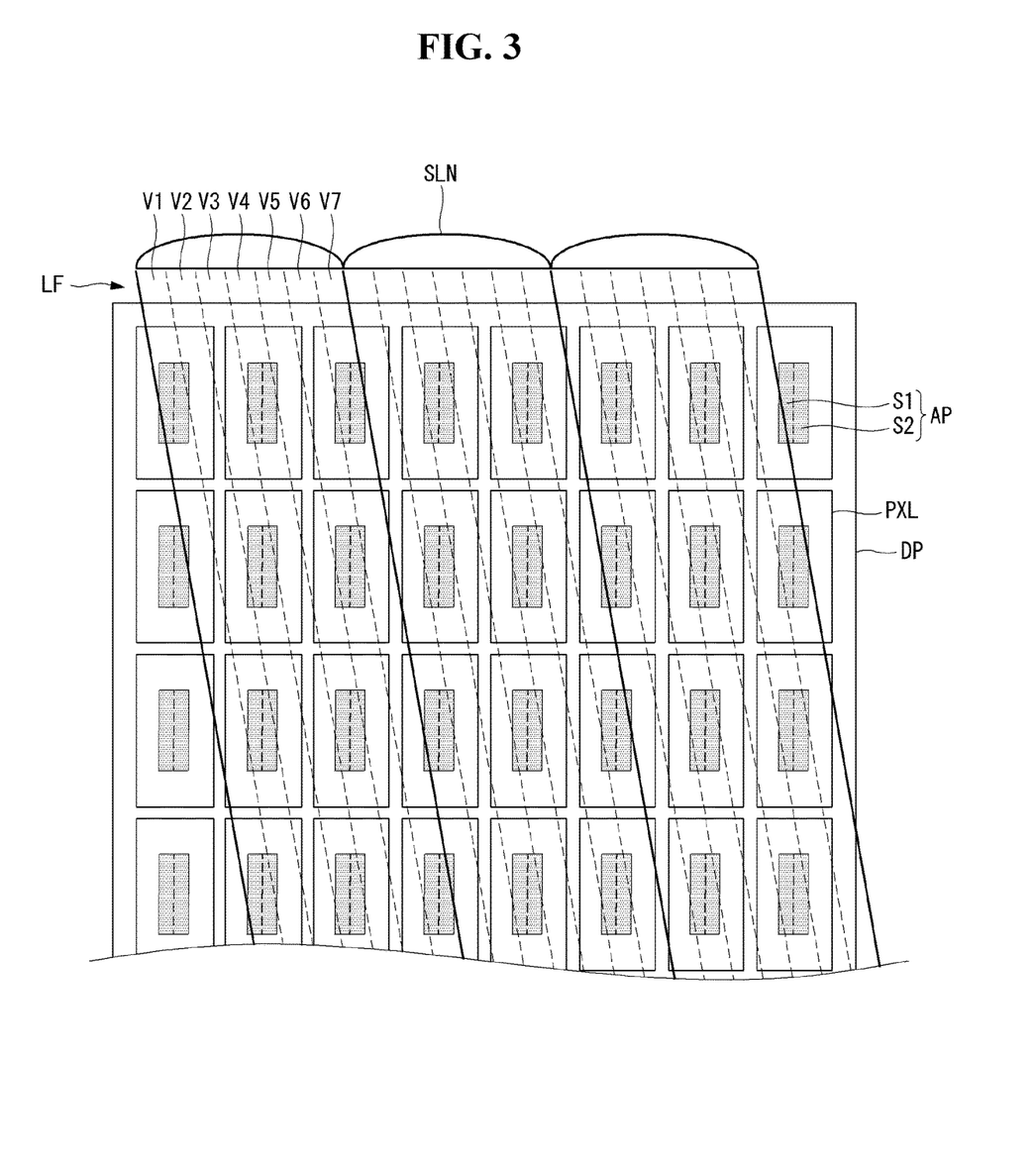
FIG. 3 is a plane view illustrating a lenticular lens type autostereoscopic 3D display according to a first embodiment of the present disclosure.

Hereinafter, referring to FIG. 3, the first embodiment of the present disclosure will be explained. FIG. 3 is a plane view illustrating a lenticular lens type autostereoscopic 3D display according to the first embodiment of the present disclosure. All the components of the lenticular lens type autostereoscopic 3D display according to all embodiments of the present disclosure are operatively coupled and configured.

Referring to FIG. 3, the lenticular lens type autostereoscopic 3D display according to the first embodiment of the present disclosure comprises a display panel DP and a lens film LF disposed on the upper surface of the display panel DP. The display panel DP includes a plurality of the pixels P×L arrayed in a matrix manner. Further, the display panel DP includes various elements for driving the pixels PXL. Each pixel PXL includes one aperture area AP.

The lens film LF includes a plurality of lenticular lenses SLN having a semi-cylindrical shape and disposed continuously in lateral direction. The lenticular lenses SLN may be disposed on the upper surface of the display panel DP as aligned as having a predetermined slanted or tilted angle. Here, the inclination (or the slanted angle) may be represented by the unit of pixel PXL. For example, in the ⅓ delta structure, the inclination of the lenticular lens SLN may be same with the value, (width of the pixel)/(3×length of the pixel). That is, the delta value may be represented as 'n/m', where n is a natural number, and m is a natural number larger than n.

The lenticular lens includes k view areas separated from each other. The view areas are defined as a plurality of segments having the same view width are arrayed in serial. At each view area has a plurality of the aperture areas AP. The pixel areas PXL allocated at the same view area represent the same video image. The view area division may be decided by the design method. Here, various methods for dividing (or separating) the view areas will not be mentioned.

FIG. 3 shows the case that the lenticular lens divides 7 view areas. The pixels allocated to each view area V1 to V7 display unique images different from each other. That is, the display shown in FIG. 3 represents 7 images observing at 7 directions, at the same time. These 7 images are separated by the lenticular lens and then provided to the 7 view areas, respectively. According to the view-map design, the number of the view areas may be changed. The number of the view areas may be larger than 7 or less than 7.

Figure 4A:
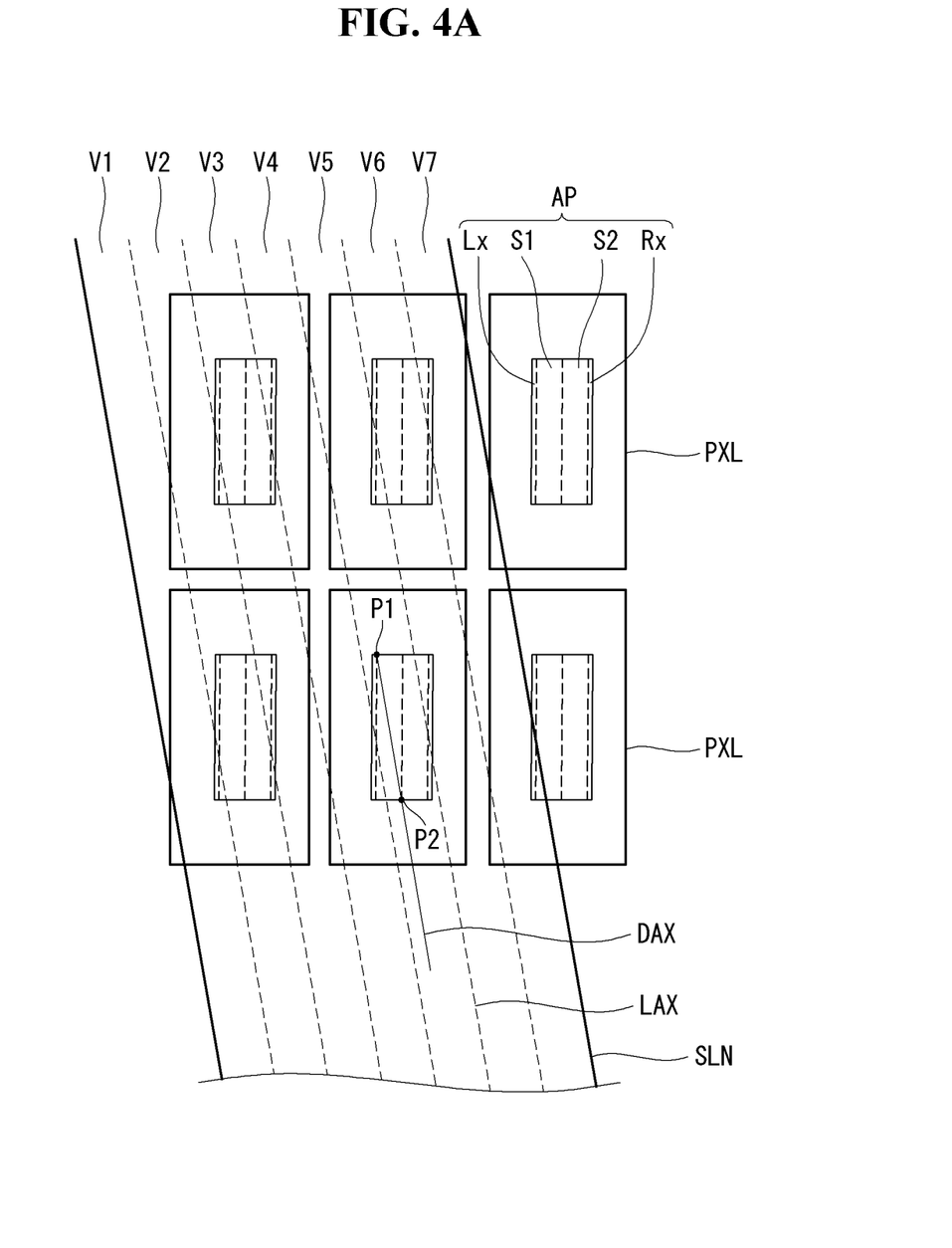
FIG. 4A is an enlarged plane view illustrating the structures of the aperture area and the lenticular lens, according to the first embodiment of the present disclosure.

One of many key features of the autostereoscopic 3D display according to the present disclosure is on the structure of the aperture area AP. There are various embodiments according to the structure of the aperture area AP. In the first embodiment, referring to FIG. 4A, the case in which the aperture area AP has two sub-aperture areas S1 and S2 will be explained. FIG. 4A is an enlarged plane view illustrating the structures of the aperture area and the lenticular lens, according to the first embodiment of the present disclosure.

Referring to FIG. 4A, in each pixel PXL, one aperture area AP is defined. The aperture area AP has a parallelogram shape. It is preferable that the lateral width of the aperture area AP is same with the lateral width of the view area defined in the lenticular lens SLN.

For the first feature of the present disclosure, the aperture area AP includes at least two sub-aperture areas, a first sub-aperture area S1 and a second sub-aperture area S2. The first sub-aperture area S1 and the second sub-aperture area S2 may have the same parallelogram shape and the same size. It is not required that these two sub-aperture areas have the same size. Here, for convenience, the case in which these two sub-aperture areas have the same size will be explained.

The left side parallelogram shown as the dotted line in FIG. 4A is a first sub-aperture S1 and the right side parallelogram is a second sub-aperture S2. Actually there is no any real division line between the first sub-aperture S1 and the second sub-aperture S2, so that a virtual division line is drawn in a dotted line in FIG. 4A.

For the second feature, at a left side and a right side of the aperture area AP, a left expansion area LX and a right expansion are RX are disposed, respectively. The left expansion area is the expanded portion of the aperture area AP to a left side direction with a first width. The right expansion area is the expanded portion of the aperture area AP to a right side direction with a second width. The left expansion area LX and the right expansion area RX are disposed in parallel. These left expansion area LX and the right expansion area RX are the additional aperture areas intentionally added into the original aperture area, as considering the manufacturing process tolerances. Actually, the aperture area AP is formed as having a parallelogram drawn by the solid line in the FIG. 4A. The dash lines are not the actual elements. The dash lines are the virtual lines for illustrating the border between the sub-aperture areas S1 and S2.

For example, when the line width tolerance is 2 μm, between two neighboring aperture areas AP, there may be an overlapped area or a gapped area of width 2 μm. In the first embodiment, the overlapped area (or margin area) is treated as the expansion area intentionally.

In detail, at the right side and the left side of the aperture area AP, the left expansion area LX and the right expansion area RX are intentionally added, respectively, to the outside of the aperture area AP. These left expansion area LX and the right expansion area RX have the widths corresponding to the half of the manufacturing process tolerance. As the results, the expansion areas inserted between two neighboring aperture areas AP is overlapped with border lines of view areas in one lenticular lens as having the same width. Therefore, there is no luminance difference at the boundary of the view areas and inside of the view area. That is, even if the manufacturing process tolerance is affected to the manufactured shapes of the aperture areas, the lenticular lens type autostereoscopic 3D display according to the present disclosure has the robust structure in which the luminance difference does not occur.

In detail, when the manufacturing process tolerance is 2 μm, the widths of the left expansion area LX and the right expansion area RX may be selected any one value from 0.5 µm to 1.5 µm. Preferably, the widths of the expansion area LX and RX may be half (1 µm) of the manufacturing process tolerance (2 µm). In another case, when the manufacturing process tolerance is 1 µm, the widths of the left expansion area LX and the right expansion area RX may be 0.5 µm.

The third feature of the present disclosure is on the relationship between the sub-aperture areas S1 and S2 and the slanted axis of the lenticular lens SLN. It is preferable that the slanted axis LAX of the lenticular lens SLN is parallel to the any one diagonal line of the sub-aperture area S1 or S2. In FIG. 4A, the dotted lines inside of the lenticular lens SLN are the imaginary lines for dividing the view areas. These dotted lines are parallel to the slanted axis LAX of the lenticular lens SLN. It is preferable that the slanted axis LAX is parallel to the diagonal axis DAX straightly linking from the left-upper corner point of the sub-aperture area S1 or S2 to the right-lower corner point of the sub-aperture area S1 or S2.

Figure 4B:
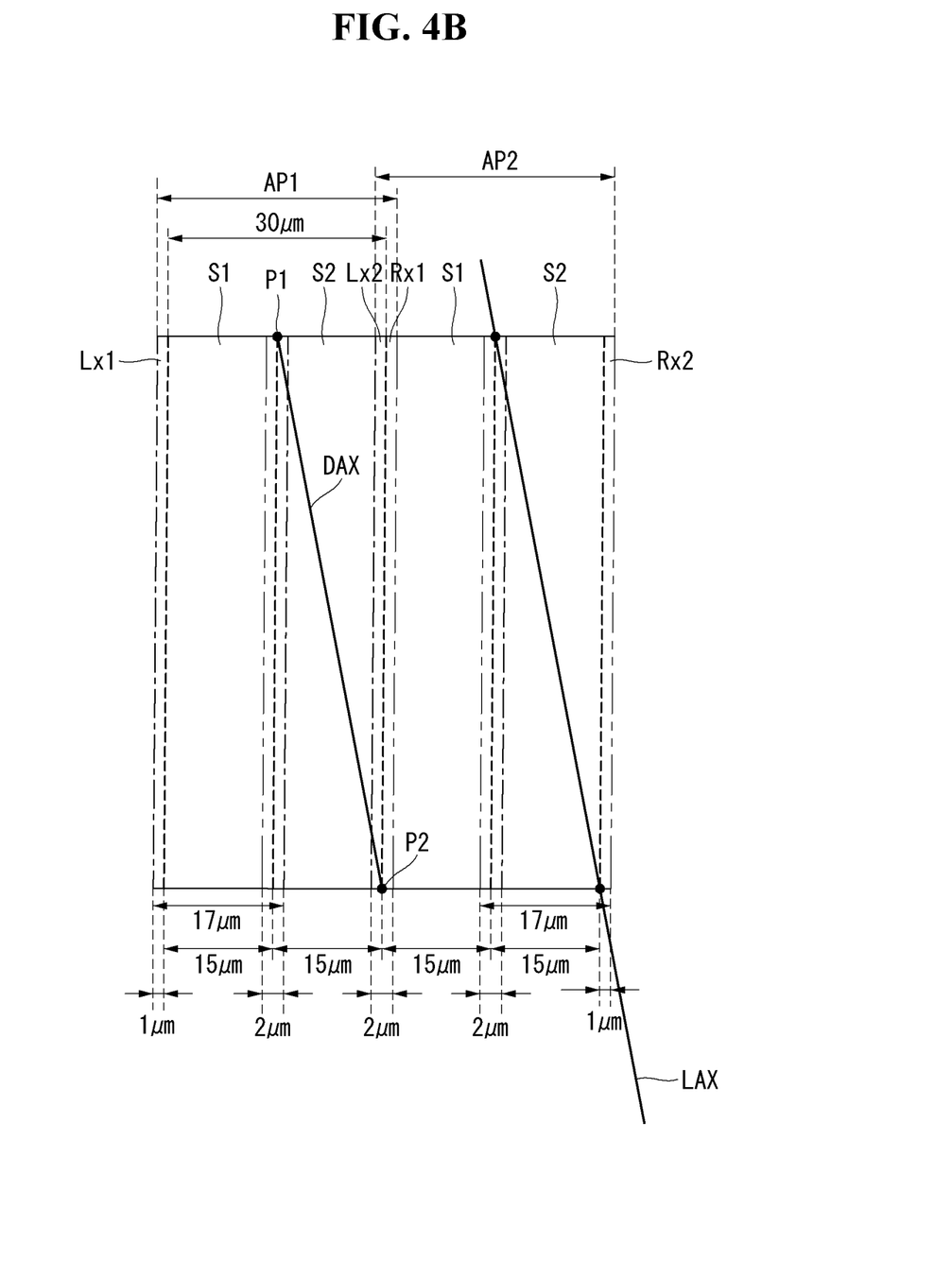
FIG. 4B is a plane view describing the robust structure for eliminating the luminance difference between two neighboring view areas in the lenticular lens type autostereoscopic 3D display according to the first embodiment of the present disclosure.

Referring to FIG. 4B, the features of the present disclosure by satisfying the above three conditions, in detail will be explained. FIG. 4B is a plane view describing the robust structure for eliminating the luminance difference between two neighboring view areas in the lenticular lens type autostereoscopic 3D display according to the first embodiment of the present disclosure.

FIG. 4B is a virtual drawing for illustrating two aperture areas in serial. Each of these two apertures is disposed at neighboring two view areas, respectively. FIG. 4B is the drawing for explaining how the observer recognizes the video images provided from the pixels of the display panel DP. The observer may recognize as the first aperture area AP1 allocated at the first view area V1 and the second aperture area AP2 allocated at the second view area V2 are continuously arrayed in lateral. Here, the first aperture area AP1 and the second aperture area AP2 would have the widths of 30 µm, respectively. The manufacturing process tolerance would be 2 µm.

The first aperture area AP1 and the second aperture area AP2 have a first sub-aperture area S1 and a second sub-aperture area S2 having the same size and shape, respectively. For example, the first sub-aperture area S1 and the second sub-aperture area S2 have the width of 15 µm. Each of the first aperture area AP1 and the second aperture area AP2 has a left expansion area LX and a right expansion area RX having widths of 1 µm at the left side and the right side, respectively.

The first aperture area AP1 and the second aperture area AP2 are continuously arrayed. The sub-aperture areas S1 and S2 having 15 µm widths of the first aperture area AP1 and the second aperture area AP2 are continuously arrayed. The first aperture area AP1 has a first left expansion area LX1 at the left side and a first right expansion area RX1 at the right side. Further, the second aperture area AP2 has a second left expansion area LX2 at the left side and a second right expansion area RX2 at the right side. As the observer recognizes the second aperture area AP2 is serially arrayed after the first aperture area AP1, the first right expansion area RX1 of the first aperture area AP1 and the second left expansion area LX2 of the second aperture area AP2 overlap each other.

Due to the first left expansion area LX1 and the first right expansion area RX1, it is resulted that the first sub-aperture area S1 and the second sub aperture area S2 of the first aperture area AP1 are also overlapped with each other. This is caused by that the slanted axis LAX of the lenticular lens SLN is aligned with the diagonal axes of the sub-aperture areas S1 and S2, and the sub-aperture areas S1 and S2 are expanded to the right side and the left side. In other words, by the left expansion area LX1 and the right expansion area RX1, it is resulted that the first sub-aperture area S1 and the second sub-aperture area S2 are expanded with 1 µm to the left and right sides, respectively.

As the results, the sub-aperture areas are arrayed with the overlapped areas having the same width between the sub-aperture areas. As the overlapped areas having the same width are regularly arrayed across the display panel, the luminance of the display would be equally detected as the observer moves across the display panel.

The first aperture area AP1 is the open area within one pixel area PXL. The first aperture area AP1 is formed by defining the first sub-aperture area S1 having 15 µm width and the second sub-aperture area S2 having 15 µm width, at first. And then, the first left expansion area LX1 having 1 µm width is defined at the left side of the first sub-aperture area S1, and the right expansion area RX1 having 1 µm width is defined at the right side of the second sub-aperture area S2. The actual shape of the first aperture area AP1 is completed as having 32 µm width within one pixel area PXL. After that, the lenticular lens SLN is disposed on the display panel as the slanted axis LAX of the lenticular lens SLN is parallel with the diagonal axis of the sub-aperture areas S1 and S2. Then, a white (brighter) line having 2 µm width is formed between the first sub-aperture area S1 and the second sub-aperture area S2. This is like that the first sub-aperture area S1 is expanded 1 µm width to the left side and 1 µm width to the right side, and the second sub-aperture area S2 is also expanded 1 µm width to the left side and 1 µm width to the right side. The second aperture area AP2 has the same structure.

When observing the display panel, the user recognizes as the first aperture area AP1 and the second aperture area are serially arrayed along the lateral direction. The first right expansion area RX1 of the first aperture area AP1 is overlapped with the second aperture area AP2, and the second left expansion area Lx2 of the second aperture area AP2 is overlapped with the first aperture area AP1. That is, at the border of the first aperture area AP1 and the second aperture area AP2, a white (brighter) line having 2 µm width is formed. As mentioned above, due to that the slanted axis LAX of the lenticular lens SLN is aligned to the diagonal axis of the sub-aperture area S1 and S2, the white line having 2 µm width is formed between the first sub-aperture area S1 and the second sub-aperture area S2. When observing the display panel, the user may recognizes that each of the 2 µm white lines is evenly disposed every 15 µm normal line. As the results, the luminance differences are evenly distributed over the whole display panel. Therefore, the observer cannot recognize the luminance difference when observing the display panel as moving along to lateral direction.

In the lenticular lens type autostereoscopic 3D display according to the first embodiment of the present disclosure, the luminance difference is less than 2% even if an observer moves his/her position. The meaning of that the luminance difference is lowered is that the autostereoscopic 3D display according to the present disclosure can provide superior video quality in which there in no luminance difference as the observer moves his/her position across the display panel.

The main reason for the high luminance difference may be the manufacturing process tolerance (or margin). The luminance differences are raised between the neighboring two aperture areas. In the present disclosure, one aperture area AP is divided into at least two sub-aperture areas S1 and S2. The left expansion area LX and the right expansion area RX having the width corresponding to the manufacturing process tolerance are disposed at the left side and the right side of the aperture area AP, respectively. Further, the aperture area AP is defined as the diagonal axis DAX of the sub-aperture areas S1 and S2 are parallel to the slanted axis LAS of the lenticular lens SLN. As the results, the left expanded area LX and the right expanded area RX are evenly distributed over the whole view areas. Further, the crossing area of the border line between two neighboring view areas with the left expansion areas LX and the right expansion area RX are equal over the whole display panel.

For reference, in the autostereoscopic 3D display shown in FIG. 1 according to the related art, the luminance difference due to the manufacturing process tolerance is measured 29.9% at least. In the related arts, it is very hard to lower the luminance difference under 20% even if the manufacturing process tolerance is reduced. On the contrary, in the autostereoscopic 3D display shown in FIG. 4A according to the first embodiment of the present disclosure, the luminance difference is 1.76% which is remarkably enhanced from the related art.

Second Embodiment

Figure 5:
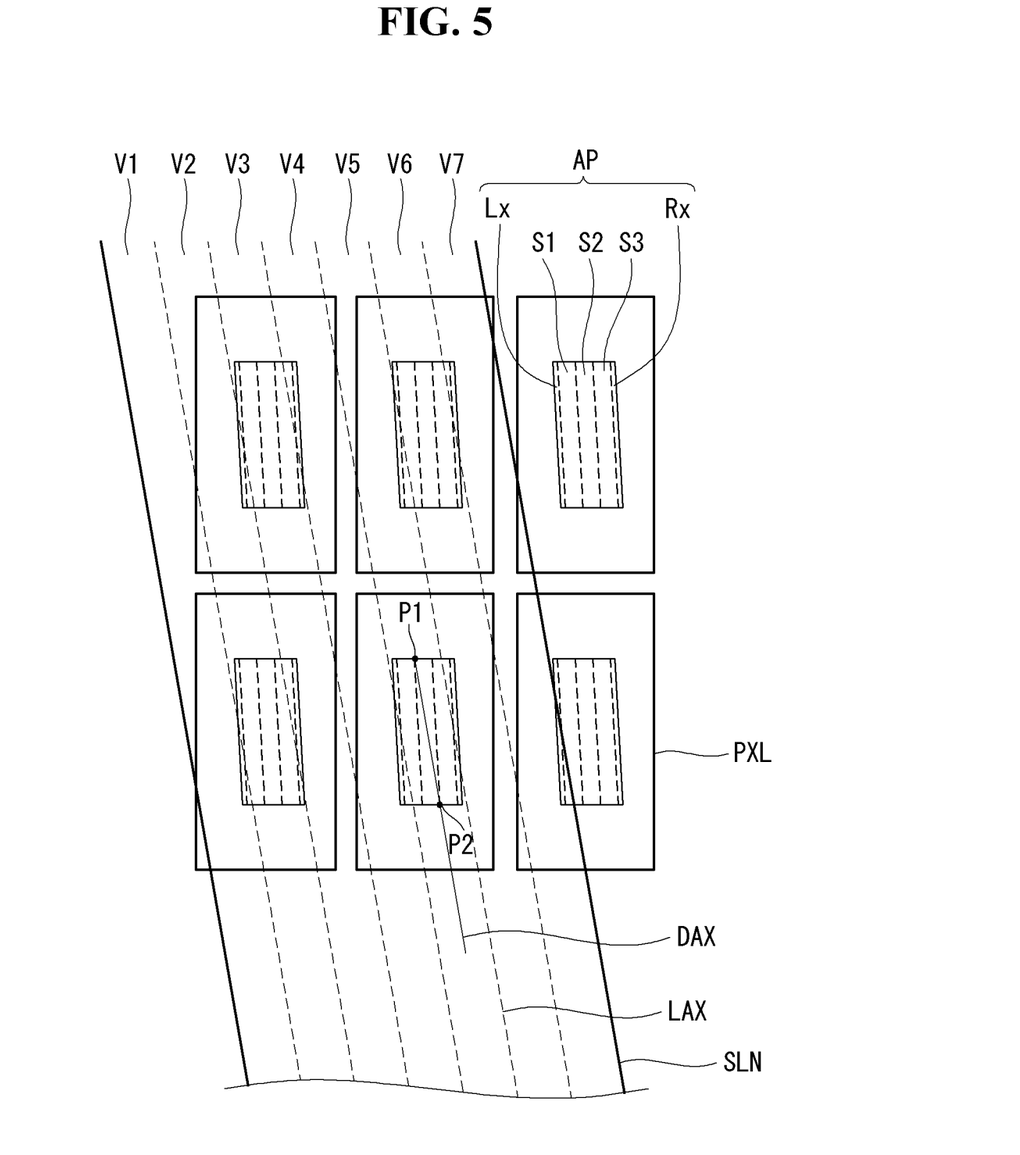
FIG. 5 is an enlarged plane view illustrating a relationship between the structure of an aperture and the structure of the lenticular lens, according to a second embodiment of the present disclosure.

Hereinafter, referring to FIG. 5, the second embodiment of the present disclosure will be explained. FIG. 5 is an enlarged plane view illustrating a relationship between the structure of an aperture and the structure of the lenticular lens, according to the second embodiment of the present disclosure. Hereinafter, for conveniences, an explanation will be provided focusing on the arraying relationship between the aperture are and the lenticular lens.

Referring to FIG. 5, an aperture area AP is defined or allocated in one pixel PXL. The aperture area AP has the parallelogram shape. It is preferable that the lateral width of the aperture area AP is same with the lateral width of one view area defined in the lenticular lens SLN. The aperture area AP includes three sub-aperture areas, a first sub-aperture area S1, a second sub-aperture area S2 and a third sub-aperture area S3. It is preferable that these three sub-aperture areas S1 to S3 have the same sized parallelogram shape.

The left side and the right side of one aperture area AP have a left expansion area LX and a right expansion area RX, respectively. The left expansion area LX and the right expansion area RX are parallel to each other. The left expansion area LX and the right expansion area RX are the expanded aperture area inserted intentionally considering the manufacturing process tolerance. For example, when the manufacturing process tolerance is 2 µm, the widths of the left expansion area LX and the right expansion area RX may be 1 µm. In another case, when the manufacturing process tolerance is 1 µm, the widths of the left expansion area LX and the right expansion area RX may be 0.5 µm.

Due to this structure, there is no luminance difference at the boundary of the view areas and inside of the view area. That is, even if the manufacturing process tolerance is affected to the manufactured shapes of the aperture areas, the lenticular lens type autostereoscopic 3D display according to the present disclosure has the robust structure in which the luminance difference is not occurred.

It is preferable that the slanted axis LAX of the lenticular lens SLN is parallel to or corresponding to any one diagonal axis of the sub-aperture areas S1, S2 or S3. In FIG. 5, the dotted lines inside of the lenticular lens SLN are the imaginary lines for dividing the view areas. These dotted lines are parallel to the slanted axis LAX of the lenticular lens SLN.

It is preferable that the slanted line LAX is parallel to the diagonal axis DAX straightly connecting from left-upper corner point to the right-lower corner point of the sub-aperture area S1, S2 or S3.

One different feature between the first embodiment and the second embodiment is the number of the sub-aperture area. In the first embodiment, the sub-aperture areas of one aperture area are two. In the second embodiment, the sub-aperture areas of one aperture area are three. Comparing FIGS. 4A and 4B with FIG. 5, as having more sub-aperture areas, the shape of the aperture area AP is closer to the shape of the view area of the lenticular lens. In the present disclosure, it is preferable that the numbers of the sub-aperture areas are two or three.

Third Embodiment

Figure 6:
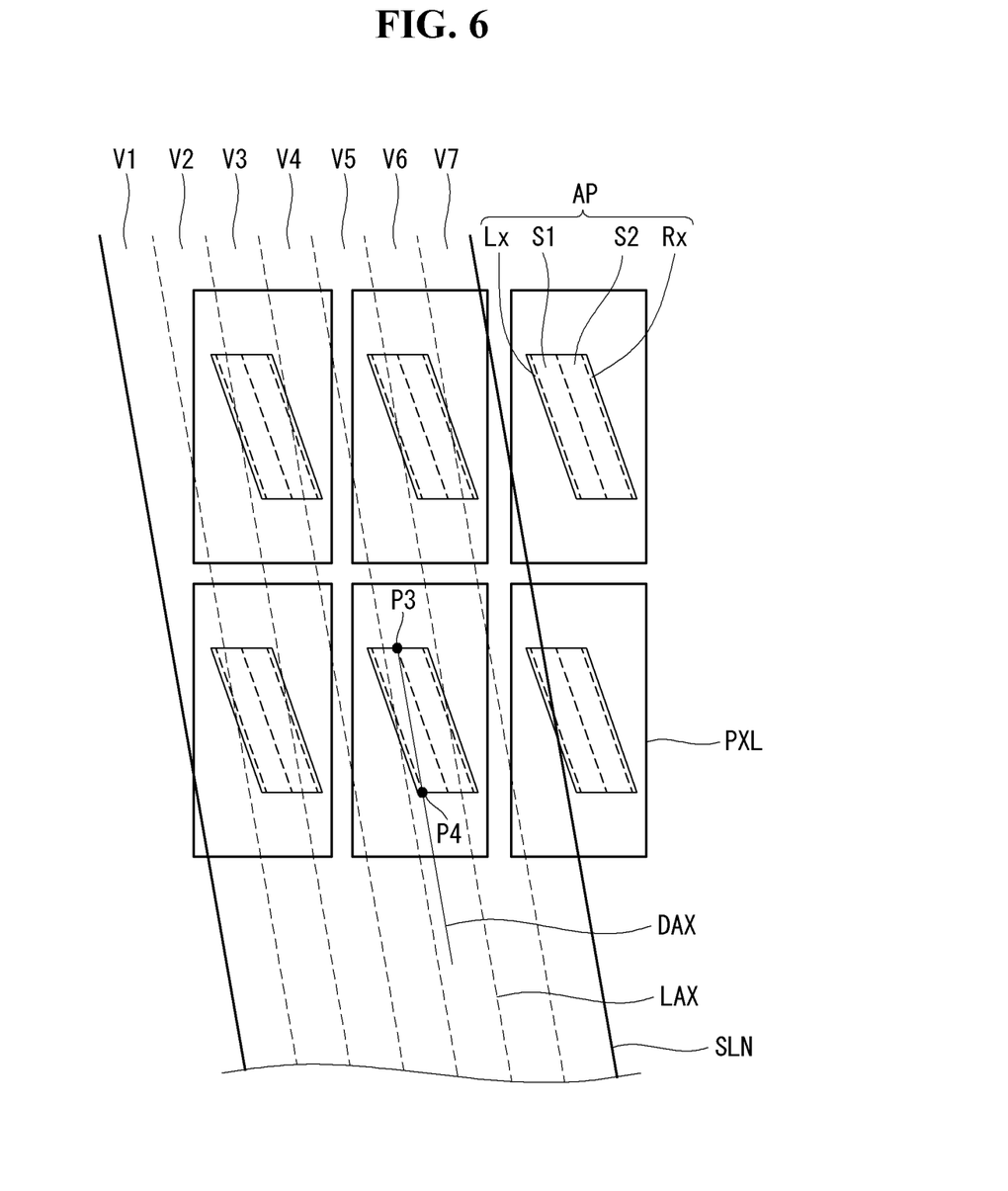
FIG. 6 is an enlarged plane view illustrating a relationship between the structure of an aperture and the structure of the lenticular lens, according to a third embodiment of the present disclosure.

Hereinafter, referring to FIG. 6, the third embodiment of the present disclosure will be explained. FIG. 6 is an enlarged plane view illustrating a relationship between the structure of an aperture and the structure of the lenticular lens, according to the third embodiment of the present disclosure.

Referring to FIG. 6, an aperture area AP is defined or allocated in one pixel PXL. The aperture area AP has the parallelogram shape. It is preferable that the lateral width of the aperture area AP is same with the lateral width of one view area defined in the lenticular lens SLN. The aperture area AP includes two sub-aperture areas, a first sub-aperture area S1 and a second sub-aperture area S2. These two sub-aperture areas S1 and S2 may have the same sized parallelogram shape. It is not required that these two sub-aperture areas have the same size and shape. For manufacturing convenience, it is preferable that two sub-aperture areas have the same size and shape.

The left side and the right side of one aperture area AP have a left expansion area LX and a right expansion area RX, respectively. The left expansion area LX and the right expansion area RX are parallel to each other. The left expansion area LX and the right expansion area RX are the expanded aperture area inserted intentionally considering the manufacturing process tolerance.

It is preferable that the left expansion area LX and the right expansion area RX disposed at the left side and the right side of the aperture area AP have the widths corresponding to half of the manufacturing process tolerance. In one example, when the manufacturing process tolerance is 1 µm, the widths of the left expansion area LX and the right expansion area RX may be 0.5 µm. However, in some cases, the widths of the left expansion area LX and the right expansion area RX may be selected in a range of 1 µm to 3 µm, inclusively, when the manufacturing process tolerance is 2 µm.

It is preferable that the slanted axis LAX of the lenticular lens SLN is parallel to or corresponding to any one diagonal axis of the sub-aperture area S1 or S2. In FIG. 6, the dotted lines inside of the lenticular lens SLN are the imaginary lines for dividing the view areas. These dotted lines are parallel to the slanted axis LAX of the lenticular lens SLN. It is preferable that the slanted line LAX is parallel to the diagonal axis DAX straightly connecting from right-upper corner point P3 to the left-lower corner point P4 of the sub-aperture area S1 or S2.

Fourth Embodiment

Figure 7:
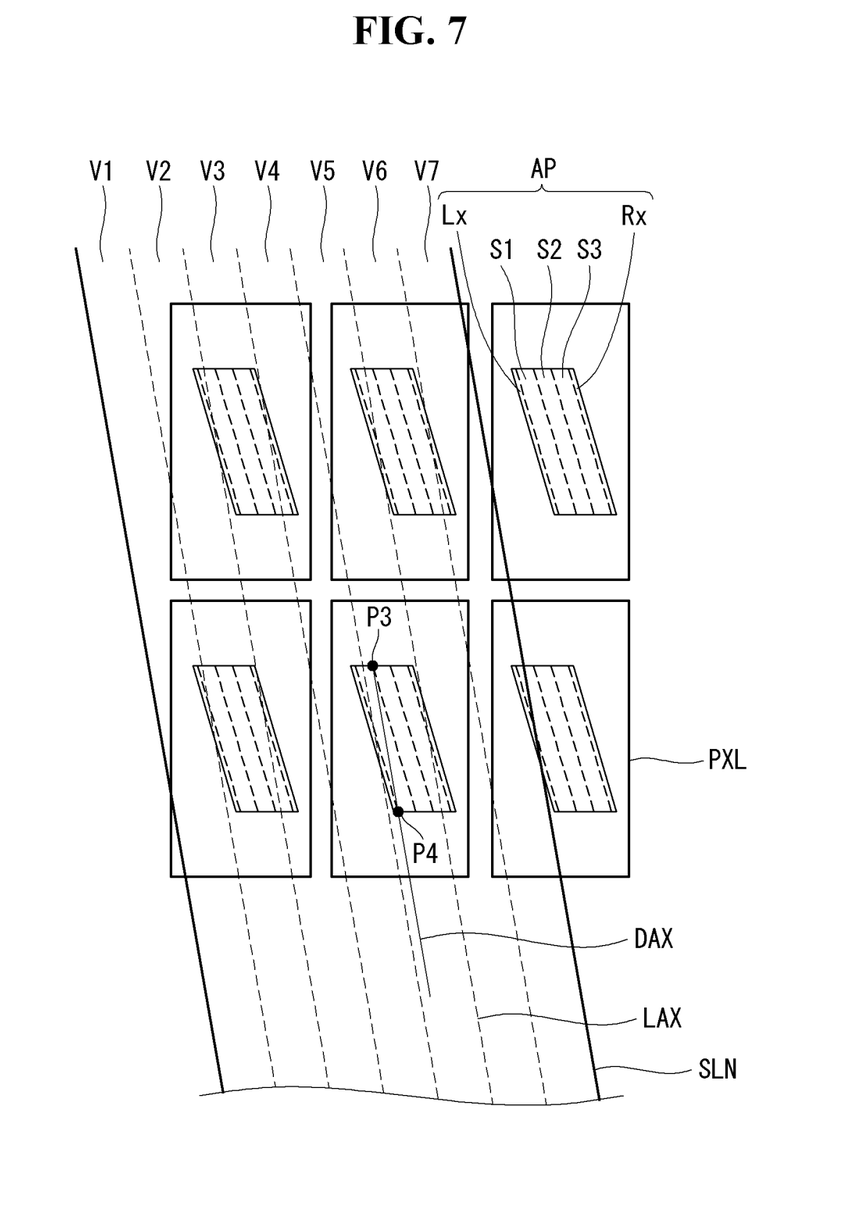
FIG. 7 is an enlarged plane view illustrating a relationship between the structure of an aperture and the structure of the lenticular lens, according to a fourth embodiment of the present disclosure.

Hereinafter, referring to FIG. 7, the fourth embodiment of the present disclosure will be explained. FIG. 7 is an enlarged plane view illustrating a relationship between the structure of an aperture and the structure of the lenticular lens, according to the fourth embodiment of the present disclosure.

Referring to FIG. 7, an aperture area AP is defined or allocated in one pixel PXL. It is preferable that the lateral width of the aperture area AP is same with the lateral width of one view area defined in the lenticular lens SLN. The aperture area AP includes three sub-aperture areas, a first sub-aperture area S1, a second sub-aperture area S2 and a third sub-aperture area S3. The aperture area AP has the parallelogram shape. Therefore, the first sub-aperture area S1, the second sub-aperture area S2 and the third sub-aperture area S3 have the same size and the same shape.

The left side and the right side of one aperture area AP have a left expansion area LX and a right expansion area RX, respectively. The left expansion area LX and the right expansion area RX are parallel to each other. The left expansion area LX and the right expansion area RX are the expanded aperture area inserted intentionally considering the manufacturing process tolerance.

It is preferable that the slanted axis LAX of the lenticular lens SLN is parallel to or corresponding to any one diagonal axis of the sub-aperture area S1, S2 or S3. In FIG. 7, the dotted lines inside of the lenticular lens SLN are the imaginary lines for dividing the view areas. These dotted lines are parallel to the slanted axis LAX of the lenticular lens SLN. It is preferable that the slanted line LAX is parallel to the diagonal axis DAX straightly connecting from right-upper corner point P3 to the left-lower corner point P4 of the sub-aperture area S1, S2 or S3.

One different feature between the third embodiment and the fourth embodiment is the number of the sub-aperture area. In the third embodiment, the sub-aperture areas of one aperture area are two. In the fourth embodiment, the sub-aperture areas of one aperture area are three. Comparing FIG. 6 with FIG. 7, as having more sub-aperture areas, the slanted degree of the aperture area AP is closer to the slanted axis LAX of the lenticular lens SLN. In the present disclosure, it is preferable that the numbers of the sub-aperture areas are two or three.

While the embodiments of the present disclosure have been described in detail with reference to the drawings, it will be understood by those skilled in the art that the disclosure can be implemented in other specific forms without changing the technical spirit or essential features of the disclosure. Therefore, it should be noted that the forgoing embodiments are merely illustrative in all aspects and are not to be construed as limiting the disclosure. The scope of the disclosure is defined by the appended claims rather than the detailed description of the disclosure. All changes or modifications or their equivalents made within the meanings and scope of the claims should be construed as falling within the scope of the disclosure.

What is claimed is:

1. An autostereoscopic three-dimensional (3D) display comprising:
    a display panel including a plurality of pixels, and an aperture area disposed at each pixel, the aperture area opening each pixel; and
    a lens film disposed on a front surface of the display panel and including a plurality of lenticular lenses, each of the plurality of lenticular lenses having a slanted axis and being continuously arrayed along a lateral direction,
    wherein the aperture area includes at least two sub-aperture areas opening the same pixel and having a same size and a same shape of a parallelogram,
    wherein the slanted axis of each of the plurality of lenticular lenses is parallel with a diagonal axis of each sub-aperture area among the at least two sub-aperture areas, the diagonal axis corresponding to an imaginary line passing through two corners of a corresponding sub-aperture area among the at least two sub-aperture areas,
    wherein each of the plurality of lenticular lenses is divided into a plurality of views.

2. The autostereoscopic 3D display according to the claim 1, wherein the aperture area includes:
    a left expansion area being a first expansion area expanded to a left direction with a first width from a first outer edge of a corresponding view among the plurality of views; and
    a right expansion area being a second expansion area expanded to a right direction with a second width from a second outer edge of the corresponding view among the plurality of views.

3. The autostereoscopic 3D display according to the claim 2, wherein the first width is equal to the second width.

4. The autostereoscopic 3D display according to the claim 2, wherein the slanted axis of each of the plurality of lenticular lenses is parallel to a first diagonal axis corresponding to a first imaginary line extending from a right-upper corner of each sub-aperture area among the at least two sub-aperture areas to a left-lower corner of each sub-aperture area among the at least two sub-aperture areas.

5. The autostereoscopic 3D display according to the claim 2, wherein the slanted axis of each of the plurality of lenticular lenses is parallel to a second diagonal axis corresponding to a second imaginary line extending from a left-upper corner of each sub-aperture area among the at least two sub-aperture areas to a right-lower corner of each sub-aperture area among the at least two sub-aperture areas.

6. The autostereoscopic 3D display according to the claim 2, wherein the first width is in range of approximately 0.5 µm to 1.5 µm, inclusively, when a manufacturing process tolerance is 2 µm.

7. The autostereoscopic 3D display according to the claim 2, wherein the first expansion area and the second expansion area have segment shapes parallel to each other.

8. The autostereoscopic 3D display according to the claim 1, wherein the plurality of views include n view areas, where n is a natural number, each of the n view areas having a strip shape parallel with the slanted axis and having a view width, and each view width of the n view areas having a same value, and
    wherein the aperture area is disposed as corresponding to one of the n view areas.

9. The autostereoscopic 3D display according to the claim 8, wherein the aperture area disposed at a $k^{th}$ view area is disposed at pixel areas representing a $k^{th}$ video image, where k is one of 1 to n.

10. The autostereoscopic 3D display according to the claim 8, wherein an aperture width defined as the lateral width of the aperture area corresponds to the view width.

11. The autostereoscopic 3D display according to the claim 1, wherein one of the plurality of views overlaps with aperture area, and
    wherein portions of opposite outer edges of the aperture area extend past outer edges of the one of the plurality of views.

12. The autostereoscopic 3D display according to the claim 1, wherein each of the plurality of lenticular lenses is disposed non-parallel to the aperture area of each of the plurality of pixels.

13. The autostereoscopic 3D display according to the claim 1, wherein the at least two sub-aperture areas overlap each other to form an overlapping portion, and
   wherein the overlapping portion is configured to emit a brighter line than other areas of the at least two sub-aperture areas.

14. The autostereoscopic 3D display according to the claim 13, wherein the brighter line has a width of approximately 2 μm.

* * * * *